United States Patent
Lisic et al.

(10) Patent No.: US 12,204,515 B1
(45) Date of Patent: Jan. 21, 2025

(54) MACHINE-LEARNING-AUTOMATED RECOGNITION AND LABELLING OF COLUMNAR DATA

(71) Applicant: Express Scripts Strategic Development, Inc., St. Louis, MO (US)

(72) Inventors: Jonathan J. Lisic, Blacksburg, VA (US); William Sniffen, Plano, TX (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

(21) Appl. No.: 18/238,135

(22) Filed: Aug. 25, 2023

(51) Int. Cl.
*G06F 16/22* (2019.01)
*G06N 20/20* (2019.01)

(52) U.S. Cl.
CPC .......... *G06F 16/221* (2019.01); *G06N 20/20* (2019.01)

(58) Field of Classification Search
None
See application file for complete search history.

(56) References Cited

U.S. PATENT DOCUMENTS

| | | | |
|---|---|---|---|
| 7,013,307 B2 | 3/2006 | Bays | |
| 7,089,266 B2 | 8/2006 | Stolte | |
| 7,305,408 B2 | 12/2007 | Morris | |
| 7,613,688 B2 | 11/2009 | Wiest | |
| 7,853,624 B2 | 12/2010 | Friedlander | |
| 8,267,531 B2 | 9/2012 | Nelson | |
| 9,164,977 B2 | 10/2015 | Byron | |
| 9,268,883 B2 | 2/2016 | Callahan | |
| 9,501,540 B2 | 11/2016 | Parker | |
| 10,380,778 B2 | 8/2019 | Apte | |
| 10,409,907 B2 | 9/2019 | Mungi | |
| 10,733,433 B2 | 8/2020 | Krishnapura Subbaraya | |
| 10,776,573 B2 | 9/2020 | Christianson | |
| 10,831,798 B2 | 11/2020 | Christianson | |
| 2007/0078881 A1 | 4/2007 | Vignet | |
| 2011/0209042 A1 | 8/2011 | Porter | |
| 2016/0104077 A1 | 4/2016 | Jackson, Jr. | |
| 2016/0154778 A1 | 6/2016 | Fourny | |

(Continued)

OTHER PUBLICATIONS

Dong et al "Learning formatting style transfer and structure extraction for spreadsheet tables with a hybrid neural network architecture." Proceedings of the 29th ACM International Conference on Information & Knowledge Management. 2020.

(Continued)

*Primary Examiner* — Kannan Shanmugasundaram
(74) *Attorney, Agent, or Firm* — Miller Johnson

(57) ABSTRACT

A computer-implemented method includes receiving input data that is organized into a set of rows and a set of columns. The method includes maintaining a machine learning header model that is trained on tabular data with header rows. The method includes supplying the input data as input to the machine learning header model to generate header row identification data that identifies a set of header rows that is a subset of the set of rows. The method includes maintaining a machine learning column model that is trained on tabular data. The method includes supplying the header row identification data and features of the input data to the machine learning column model to generate column label data that applies a set of defined labels to the set of columns. The method includes generating output data that is organized into rows and columns.

15 Claims, 15 Drawing Sheets

(56) References Cited

U.S. PATENT DOCUMENTS

| | | | |
|---|---|---|---|
| 2016/0300197 | A1 | 10/2016 | Guido |
| 2018/0225270 | A1 | 8/2018 | Bhide |
| 2019/0034822 | A1 | 1/2019 | Farré Guiu |
| 2019/0102620 | A1 | 4/2019 | Siddiq |
| 2020/0349467 | A1 | 11/2020 | Teague |
| 2020/0401798 | A1 | 12/2020 | Foncubierta Rodriguez |
| 2021/0019287 | A1* | 1/2021 | Prasad .................. G06F 16/258 |
| 2021/0097342 | A1 | 4/2021 | Oberhofer |
| 2021/0232908 | A1* | 7/2021 | Xian ...................... G06N 3/045 |
| 2021/0334275 | A1* | 10/2021 | Smart .................. G06F 16/2456 |
| 2021/0350001 | A1* | 11/2021 | Alturaifi ................. G06F 16/38 |
| 2021/0406452 | A1 | 12/2021 | Hasan |
| 2022/0245175 | A1* | 8/2022 | Hawco .................. G06F 16/906 |
| 2023/0316147 | A1 | 10/2023 | Dias Barata |

OTHER PUBLICATIONS

Koci, et al "Xlindy: Interactive recognition and information extraction in spreadsheets." Proceedings of the ACM Symposium on Document Engineering 2019. 2019.

\* cited by examiner

FIG. 7

| sheet_id | sheet_name | row | max_cols | ... | prob | selected |
|---|---|---|---|---|---|---|
| 0 | Sheet1 | 0 | 13 | | 0.0000068 | NA |
| 0 | Sheet1 | 1 | 13 | | 0.962 | 1 |
| 0 | Sheet1 | 2 | 13 | | 0.0000483 | NA |
| 0 | Sheet1 | 3 | 13 | | 0.00024 | NA |
| 0 | Sheet1 | 4 | 13 | | 0.0000188 | NA |
| 0 | Sheet1 | 5 | 13 | | 0.000103 | NA |
| 0 | Sheet1 | 6 | 13 | | 0.00012 | NA |
| 0 | Sheet1 | 7 | 13 | | 0.0000112 | NA |
| 0 | Sheet1 | 8 | 13 | | 0.000000842 | NA |
| 0 | Sheet1 | 9 | 13 | | 0.000000782 | NA |
| ... | ... | ... | ... | | ... | ... |
| 0 | Sheet1 | 40 | 13 | | 0.00000449 | NA |

FIG. 8

| X_0 | X_1 | X_2 | X_3 | X_4 | X_5 | X_6 | X_7 | X_8 | X_9 | X_10 | X_11 | X_12 |
|---|---|---|---|---|---|---|---|---|---|---|---|---|
| 232077 | ANJELICA | ABBOTT | Employee | Active | Full Time | 3/5/84 | Female | 27258 | PPO | EE | Graham | NC |
| 358319 | PRINCESS | ABBOTT | Employee | Active | Part Time | 12/23/65 | Female | 27258 | HMO | EE+CHILDREN | Graham | NC |
|  | FEDERICO | ABBOTT | Child |  |  | 9/26/03 | Male |  |  |  |  |  |
|  | KENNETH | ABBOTT | Child |  |  | 10/1/07 | Male |  |  |  |  |  |
| 417595 | SHAWNDA | ABDULLAH | Employee | Active | Full Time | 9/17/87 | Female | 27258 | HMO | EE+FAM | Graham | NC |
|  | GAIL | ABDULLAH | Spouse |  |  | 3/3/84 | Male |  |  |  |  |  |
|  | FRANKLIN | ABDULLAH | Child |  |  | 10/17/01 | Male |  |  |  |  |  |
|  | CHLOE | ABDULLAH | Child |  |  | 12/30/20 | Female |  |  |  |  |  |
|  | DIGNA | ABDULLAH | Child |  |  | 5/7/07 | Female |  |  |  |  |  |
| 377010 | EFRAIN | ABEL | Employee | Active | Full Time | 3/27/83 | Male | 28734 | PPO | EE+SP | Franklin | NC |
|  | JERLENE | SHORE | Spouse |  |  | 10/31/92 | Female |  |  |  |  |  |
| 481490 | KEILA | ABELL | Employee | Active | Full Time | 8/18/85 | Female | 28734 | HMO | EE+CH | Franklin | NC |
|  | CORINNA | ABELL | Child |  |  | 7/19/13 | Female |  |  |  |  |  |

FIG. 9

| header_name | header_name_before | header_name_after | predicted | confidence | header_count | feature_count | sheet_name | sheet_id | skip_count |
|---|---|---|---|---|---|---|---|---|---|
| Employee ID | NA | 223077 | id | 0.74196665 | 1 | X_0 | Sheet1 | 0 | 1 |
| First Name | NA | ANJELICA | firstname | 0.97063003 | 2 | X_1 | Sheet1 | 0 | 1 |
| Last Name | NA | ABBOTT | lastname | 0.96976896 | 3 | X_2 | Sheet1 | 0 | 1 |
| Employee or Dependent | NA | Employee | relationship | 0.92247016 | 4 | X_3 | Sheet1 | 0 | 1 |
| Employee Status | NA | Active | status | 0.91866577 | 5 | X_4 | Sheet1 | 0 | 1 |
| Eligibility Class | NA | Full Time | status | 0.95022848 | 6 | X_5 | Sheet1 | 0 | 1 |
| Date of Birth | NA | 3/5/84 0:00 | dob | 0.99713338 | 7 | X_6 | Sheet1 | 0 | 1 |
| Gender | NA | Female | gender | 0.98897396 | 8 | X_7 | Sheet1 | 0 | 1 |
| ZIP | NA | 27288 | zipcode | 0.98862715 | 9 | X_8 | Sheet1 | 0 | 1 |
| Medical Plan | NA | PPO | medplan | 0.98864032 | 10 | X_9 | Sheet1 | 0 | 1 |
| Medical Coverage Tier | NA | EE | medtier | 0.98624411 | 11 | X_10 | Sheet1 | 0 | 1 |
| City | NA | Graham | city | 0.97899774 | 12 | X_11 | Sheet1 | 0 | 1 |
| State | NA | NC | state | 0.9680054 | 13 | X_12 | Sheet1 | 0 | 1 |

MACHINE-LEARNING-AUTOMATED RECOGNITION AND LABELLING OF COLUMNAR DATA

FIELD

The present disclosure relates to database extract, transform, and load processes and more particularly to automated recognition and labeling of data from input sources.

SUMMARY

A computer-implemented method includes receiving input data that is organized into a set of rows and a set of columns. The computer-implemented method includes maintaining a machine learning header model that is trained on tabular data with header rows. The computer-implemented method includes supplying the input data as input to the machine learning header model to generate header row identification data that identifies a set of header rows that is a subset of the set of rows. The computer-implemented method includes maintaining a machine learning column model that is trained on tabular data. The computer-implemented method includes supplying the header row identification data and features of the input data to the machine learning column model to generate column label data that applies a set of defined labels to the set of columns. The computer-implemented method includes generating output data that is organized into rows and columns. Columns of the output data are labelled based on the column label data.

In other features, to each of the set of columns, the column label data applies one of the set of defined labels. In other features, the machine learning column model includes a plurality of column-specific machine learning models. Each of the plurality of column-specific machine learning models corresponds to one of the set of defined labels. In other features, the computer-implemented method includes, for each column of the set of columns: determining scores from the plurality of column-specific machine learning models for the column; determining a highest scoring model of the plurality of column-specific machine learning models; and selectively applying the one of the set of defined labels corresponding to the highest scoring model to the column.

In other features, the set of defined labels includes an undefined label. The computer-implemented method includes, for each column of the set of columns, applying the undefined label to the column in response to the score of the highest scoring model being less than a threshold. In other features, supplying the header row identification data and features of the input data to the machine learning column model includes, for each column of the set of columns, supplying features of the column to each of the plurality of column-specific machine learning models. For each column of the set of columns, the features include data values from the column.

In other features, for each column of the set of columns, the features include a relative position of the column to other columns in the input data. In other features, for each column of the set of columns, the features include an absolute left-to-right position of the column in the input data. In other features, the computer-implemented method includes using the machine learning header model to determine a header row score for a subset of the set of rows; in response to the header row score for a row exceeding a threshold, including the row in the header row identification data. In other features, the computer-implemented method includes replacing the set of header rows with the column label data.

In other features, the computer-implemented method includes: maintaining a machine learning junk model that is trained on tabular data; supplying features of the input data to the machine learning junk model to generate junk scores for the set of rows; and for any row of the set of rows having a junk score above a threshold, excluding the row from the output data. In other features, the computer-implemented method includes preprocessing the input data by: maintaining a machine learning password model that is trained on passwords, supplying the input data to the machine learning password model to generate password likelihood scores, and excluding elements of the input data from further processing in response to the element having a password likelihood score exceeding a threshold.

In other features, the input data is received as a set of files. The output data includes a file. In other features, the input data includes at least one of semi-structured data and tabular data. In other features, the computer-implemented method includes parsing the semi-structured data into the input data by organizing the semi-structured data into the set of rows and the set of columns.

A system includes processor hardware and memory hardware configured to store instructions that, when executed by the processor hardware, cause the processor hardware to perform operations. The operations include receiving input data that is organized into a set of rows and a set of columns. The operations include maintaining a machine learning header model that is trained on tabular data with header rows. The operations include supplying the input data as input to the machine learning header model to generate header row identification data that identifies a set of header rows that is a subset of the set of rows. The operations include maintaining a machine learning column model that is trained on tabular data. The operations include supplying the header row identification data and features of the input data to the machine learning column model to generate column label data that applies a set of defined labels to the set of columns. The operations include generating output data that is organized into rows and columns. Columns of the output data are labelled based on the column label data.

In other features, to each of the set of columns, the column label data applies one of the set of defined labels. In other features, the machine learning column model includes a plurality of column-specific machine learning models. Each of the plurality of column-specific machine learning models corresponds to one of the set of defined labels. In other features, the system includes, for each column of the set of columns: determining scores from the plurality of column-specific machine learning models for the column; determining a highest scoring model of the plurality of column-specific machine learning models; and selectively applying the one of the set of defined labels corresponding to the highest scoring model to the column.

A non-transitory computer-readable medium storing processor-executable instructions, the instructions include receiving input data that is organized into a set of rows and a set of columns. The instructions include maintaining a machine learning header model that is trained on tabular data with header rows. The instructions include supplying the input data as input to the machine learning header model to generate header row identification data that identifies a set of header rows that is a subset of the set of rows. The instructions include maintaining a machine learning column model that is trained on tabular data. The instructions include supplying the header row identification data and features of the input data to the machine learning column model to generate column label data that applies a set of defined labels to the set of columns. The instructions include generating output data that is organized into rows and columns. Columns of the output data are labelled based on the column label data.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 7 is an example input data file.

FIG. 8 is an example header identification output.

FIG. 9 is an illustration of the example input data file of FIG. 7 undergoing one or more processing steps.

FIG. 10 is an example column type identification output.

FIG. 12 is an illustration of the example input data file of FIG. 7 undergoing one or more processing steps.

FIG. 13 is an illustration of the example input data file of FIG. 7 undergoing one or more processing steps.

FIG. 14 is an example output data file.

In the drawings, reference numbers may be reused to identify similar and/or identical elements.

DETAILED DESCRIPTION

High-Volume Pharmacy

Figure 1:
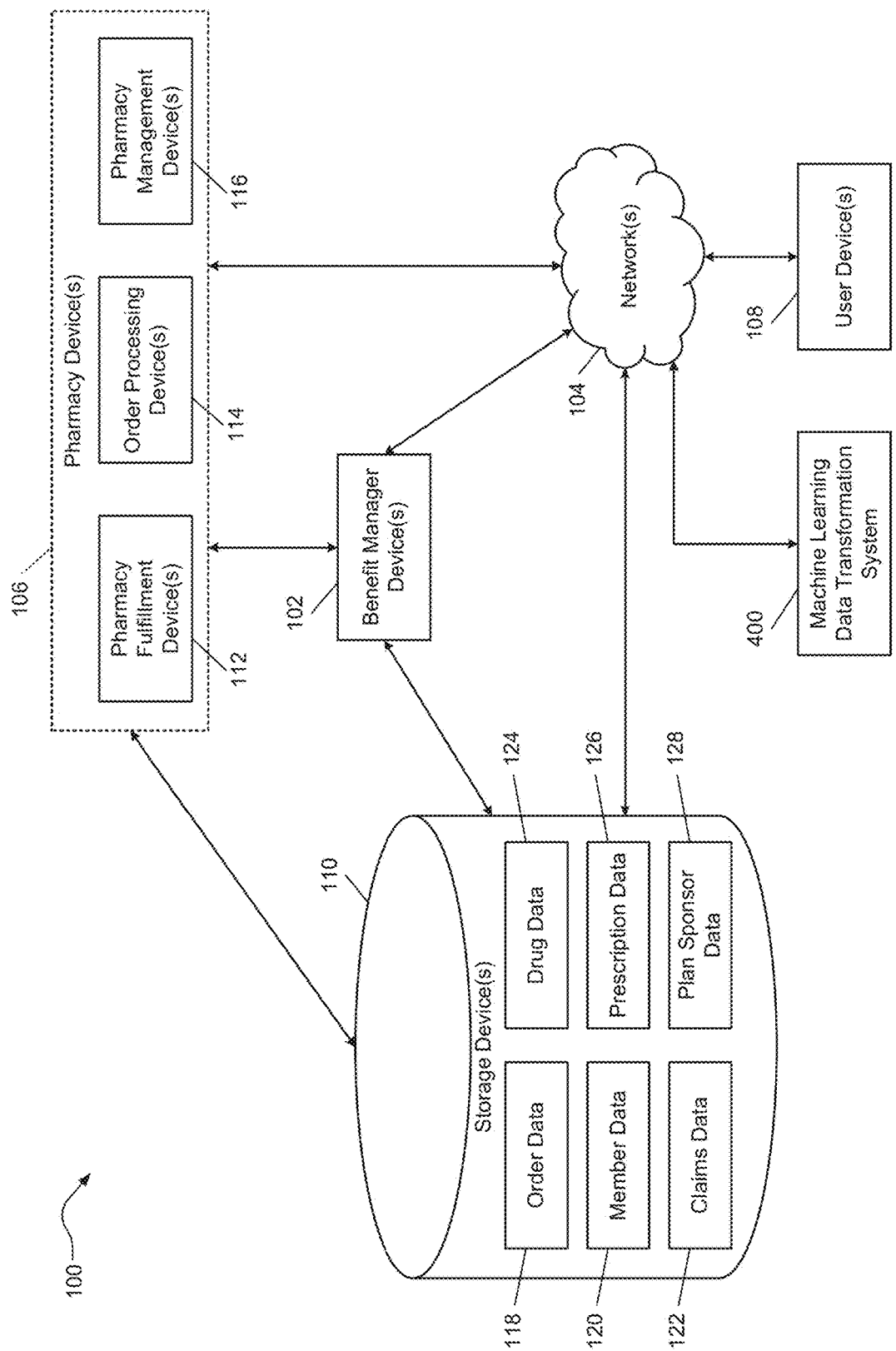
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, age, date of birth, address (including city, state, and zip code), telephone number, e-mail address, medical history, prescription drug history, etc. In various implementations, the prescription drug history may include a prior authorization claim history-including the total number of prior authorization claims, approved prior authorization claims, and denied prior authorization claims. In various implementations, the prescription drug history may include previously filled claims for the member, including a date of each filled claim, a dosage of each filled claim, the drug type for each filled claim, a prescriber associated with each filled claim, and whether the drug associated with each claim is on a formulary (e.g., a list of covered medication).

In various implementations, the medical history may include whether and/or how well each member adhered to one or more specific therapies. The member data 120 may also include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. In various implementations, the member data 120 may include an eligibility period for each member. For example, the eligibility period may include how long each member is eligible for coverage under the sponsored plan. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member). In various implementations, the claims data 122 may include a percentage of prior authorization cases for each prescriber that have been denied, and a percentage of prior authorization cases for each prescriber that have been approved.

The drug data 124 may include drug name (e.g., technical name and/or common name), other names by which the drug is known, active ingredients, an image of the drug (such as in pill form), etc. The drug data 124 may include information associated with a single medication or multiple medications. For example, the drug data 124 may include a numerical identifier for each drug, such as the U.S. Food and Drug Administration's (FDA) National Drug Code (NDC) for each drug.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
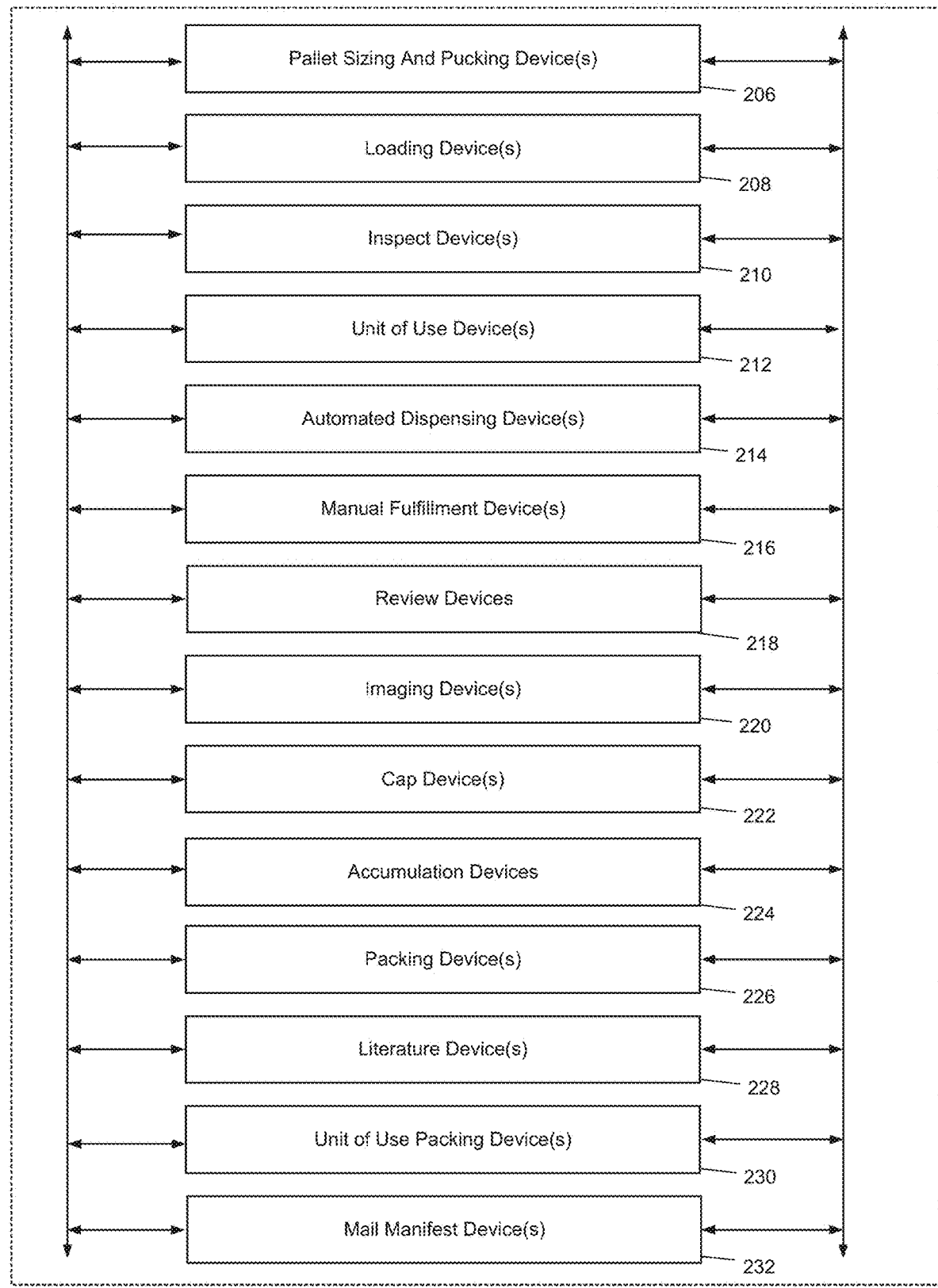
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
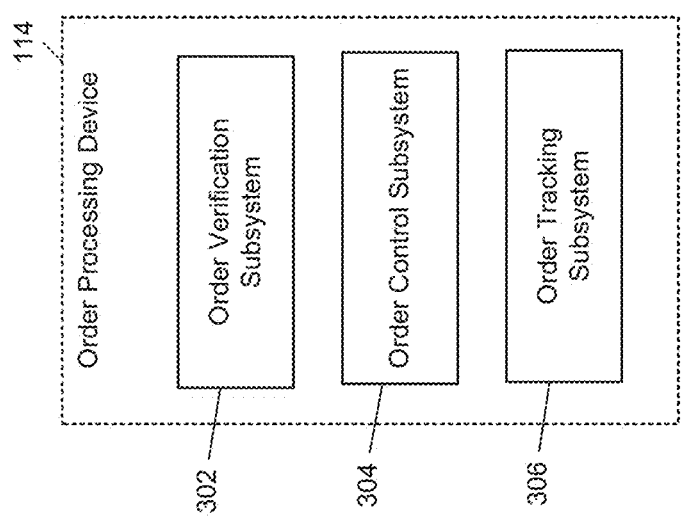
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Machine Learning Data Transformation System

Organizations that process large volumes of data often receive data from a variety of sources and generally do not have control over, or even an understanding of, the format of the received data. For example, even when a specific universe of data is expected (such as, in the case of health plan data, first name, last name, date of birth, insured status, etc.), the received data may not have a regular format that easily allows the data to be correctly labeled. For example, differentiating between last name and first name fields in a table may be difficult when a header row of the table is hard to identify, missing, or uses non-standard labels for the columns. Further, differentiating between date columns-such as date of birth, date of first insurance, date of most recent provider visit, etc.—is not trivial.

These problems may exist any time tabular data—such as in a spreadsheet format or comma separated value (CSV)—is exchanged without an agreement between both parties to the exchange about how to label the data. Even semi-structured data, such as extensible markup language (XML) or JavaScript object notation (JSON) may use tags and field descriptions that are not readily parsed. Labeling data elements allow the processing system to correctly interpret received data. For tabular data, labeling may include identifying which column has what significance—in various implementations, the labeling of some columns may be indeterminate and may trigger further review, such as by a human. Labeling may also include identifying which row or rows, if any, have header data to assist in the labeling. Labeling may also include identifying which row or rows, if any, do not have useful data: for example, a non-useful (or, junk) row may be empty, have descriptive text unrelated to other data in the columns, or have other non-useful data.

Returning to FIG. 1, the system 100 may include a machine learning data transformation system 400 configured to automatically identify, predict, scrub, and/or standardize data from input files. To be clear, the data may be received as a set of one or more files, or may be received in another fashion, such as via a stream. In various implementations, the received data may be all or only a part of the set of files (for example, when the set of files carries data for multiple audiences or purposes).

The transformation system 400 is configured to convert input data files into output data files containing relevant information in a standardized format ready for review/processing by the user. In various implementations, file sizes of the output data files are substantially smaller than those of the input data files. For example, file size may be reduced by, on average, more than 5%, 10%, or 20%. In addition, the data types and formatting of the output data files may be regularized to conform to an expected set of defined norms. For example, certain data elements may be defined to have specific data types—for example, age may be designated as an integer, while birthdate may be designated as an integer (such as an unsigned integer) storing a Unix epoch, Microsoft Excel epoch, or universal time coordinated (UTC) timestamp. In various implementations, the present disclosure independently assesses the format of a data value in a date column to accommodate a date column containing a mixture of multiple date formats. Further, data elements may be defined to have an enumerated set of values—for example, the state of a U.S. address may be selected from a set of strings including "AL", "AK", "AZ", etc.

Further, other extract, transform, and load processes may be applied to, for example, regularize addresses. In addition, incomplete, inaccurate, and/or unnecessary data may be excluded from the output data files. Unlike the transformation system 400, which can perform this conversion quickly (in various implementations, in less than 1 second, 5 seconds, 30 seconds, or 60 seconds), performing this work manually may take a human a substantial amount of time, such as 10 minutes, 30 minutes, or 60 minutes. Further, human processing may be more prone to errors, such as mislabeling of data elements, since a human-even with unlimited amounts of time-cannot perform the statistical analyses of the transformation system 400 to develop estimates of correct data labels.

As an example only, census data files are a type of data file that may include detailed information about an organization's members, employees, and/or insured individuals. The census data files may include employee level census data and/or member level census data. For example, the census data files may include personal details (e.g., age, sex, date of birth, marital status, occupation, education level, etc.), geographic information (e.g., address), income and economic indicators (e.g., income, employment status, occupation type, etc.), ethnicity and race, health-related data (e.g., health conditions, disabilities, healthcare access, medical claims data, etc.), pharmacy claims, patient information, prescription information, prescribing provider, dispensing pharmacy details, dates and timestamps, pricing and cost information, and/or claim adjudication details, among others. The census data files may include tabular data, structured data, semi-structured data, and/or unstructured data. The census data files may originate from various sources such as a human resources (HR) system of an organization, a claims database, and/or another internal or external data source.

The census data files may be used by an underwriting (UW) department of an insurance company to evaluate the risk and/or cost of insuring a particular group of individuals or employees. The census data files typically include a substantial amount of data-some of which may be incomplete, unnecessary, and/or may have differing formats. A UW department manually processes the census data files to determine the risk and/or the cost of insuring the group of individuals or employees and this process is slow, error-prone, and costly due to the amount and quality of the data in the census data files.

UW department may use the transformation system 400 to generate output files that can be readily reviewed/processed to determine risks and costs associated with insuring a group of individual or employees. Using the transformation system 400 may save, in various implementations, 30 minutes of human time per review. For a UW department that processes over 50,000 requests for proposal per year, this may result in a savings of $1 million or more.

Figure 4:
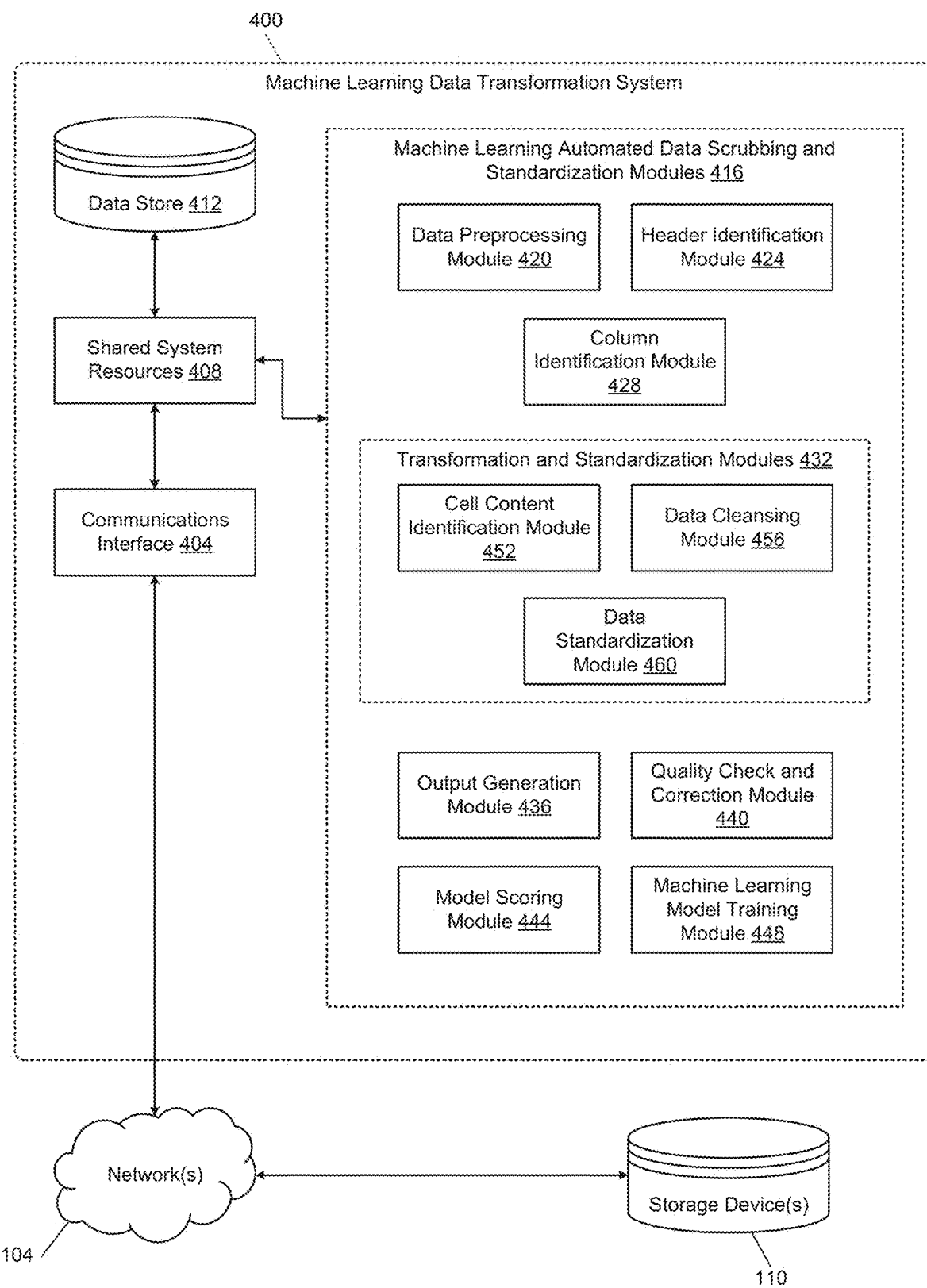
FIG. 4 is a functional block diagram of an example machine learning data transformation system.

FIG. 4 is a functional block diagram of an example transformation system 400. As shown in FIG. 4, the transformation system 400 may include a communication interface 404, shared system resources 408, one or more data stores including non-transitory computer-readable storage media, such as a data store 412, and one or more machine learning automated data scrubbing and standardization modules 416. In various implementations, the communication interface 404 may be suitable for communicating with other components of the system 100 over the network 104. In various implementations, the communication interface 404 may include a transceiver suitable for sending and/or receiving data to and from other components of the system 100. In various implementations, the shared system resources 408 may include one or more processors, volatile and/or non-volatile computer memory-such as random-access memory, system storage-such as non-transitory computer-readable storage media, and one or more system buses connecting the components of the shared system resources 408.

In various implementations, the communication interface 404, the data store 412, and/or the machine learning automated data scrubbing and standardization modules 416 may be operatively coupled to the shared system resources 408 and/or operatively coupled to each other through the shared system resources 408. In various implementations, the machine learning automated data scrubbing and standardization modules 416 may be software modules stored on non-transitory computer-readable storage media, such as system storage and/or the one or more data stores of system 100. In various implementations, one or more processors of the shared system resources 408 may be configured to execute the instructions of the machine learning automated data scrubbing and standardization modules 416. In various implementations, the machine learning automated data scrubbing and standardization modules 416 includes a data preprocessing module 420, a header identification module 424, a column identification module 428, transformation and standardization modules 432, an output generation module 436, a quality check and correction module 440, a model scoring module 444, and a machine learning model training module 448.

In various implementations, the data preprocessing module 420 may be configured to perform initial data processing of the input data files (i.e., the census data files). In various implementations, the input data files may include data arranged in a set of columns and a set of rows. The header identification module 424 may be configured to identify and/or locate the data in the input data files such that the data can be used for further processing. For example, the header identification module 424 may be configured to predict the locations of the header rows in the input data files to identify a starting location of the data. In various implementations, the header identification module 424 may include and/or may be configured to execute a set of machine learning models that are trained (for example, via supervised training) to carry out the operation of the header identification module 424.

In various implementations, the column identification module 428 may be configured to predict, classify, and/or identify the column type of each column of the data in the input data files. The column type may describe the specific type of data in a column and may identify specific processing requirements. In various implementations, a column type prediction may include a column type from a set of defined column type categories as described below in Table 1.

TABLE 1

| Order | Column Type | Description |
|---|---|---|
| 1 | gender | Gender column |
| 2 | firstname | First name (can be multiple) |
| 3 | age | Age (assumed numeric) |
| 4 | dob | Date of birth (e.g., Excel date format) |

TABLE 1-continued

| Order | Column Type | Description |
|---|---|---|
| 5 | lastname | Last name |
| 6 | names | First and last names (e.g., "Jonathan Lisic", "Lisic, Jonathan", "Jonathan James Lisic", "Lisic, Jonathan J.", etc.) |
| 7 | zipcode | Zip code |
| 8 | address | A variant or subset of a mailing address (e.g., "123", "123 Main St.", "123 Main St. Denver Colorado 80220", etc.) |
| 9 | id | ID or social security number (SSN) identifying an individual or employee |
| 10 | state | State of the U.S. including territories |
| 11 | city | City |
| 12 | relationship | Employee or dependent (including child/daughter/son or married/single) |
| 13 | prodtype | Product type (Medical/Dental/Vision (MDV)) |
| 14 | prodtier | Tier for multiple products |
| 15 | prodplan | Plan for multiple products |
| 16 | medtier | Medical coverage tier (e.g., employee only, employee + spouse, employee + child(ren), waive, family, new, terminated employee, etc.) |
| 17 | medplan | Medical plan (e.g., PPH, HMO, etc.), plan level (e.g., 1, 2, 3, gold, silver, platinum, basic, plus, premium, etc.), plan id (e.g., bksd899009, etc.) |
| 18 | dentier | Dental coverage tier (similar to medtier but for dental) |
| 19 | denplan | Dental plan (similar to medplan but for dental) |
| 20 | vistier | Vision coverage tier (similar to medtier but for dental) |
| 21 | visplan | Vision plan (similar to medplan but for dental) |
| 22 | carrier | Carrier (e.g., Cigna, MetLife, Humana, etc.) |
| 23 | medplantier | Plan and tier stretched out over multiple columns (e.g., header name (HMO, PPO, etc.) including tier contents |
| 24 | denplantier | Similar to medplantier but for dental |
| 25 | coverage | Coverage (binary Y/N for MDV) |
| 26 | visplantier | Similar to medpantier but for vision |
| 27 | status | For example, full-time, part-time, union, active, terminated, cobra, eligible, etc. |
| 28 | doh | Date of hire |
| 29 | depcount | Dependent count (assumed numeric) |
| 30 | waive | Y/N or waiver reason |
| 31 | cobra | Contains cobra |
| 32 | occupation | Occupation |
| 33 | salary | Salary monthly/yearly/hourly |
| 34 | key | Some portion of a table (usually to the left or right of the data) |
| 35 | other | Catch all (e.g., LTD, STD, Life, or other supplemental benefits) |

The column identification module 428 may be configured to generate and/or calculate a column type confidence score for each of the column type predictions. In various implementations, the column identification module 428 may include and/or may be configured to execute a set of machine learning models that are trained (for example, via supervised training) to carry out the operation of the column identification module 428.

In various implementations, the transformation and standardization modules 432 may include a cell content identification module 452, a data cleansing module 456, and a data standardization module 460. The cell content identification module 452 may be configured to classify, identify, and/or predict data of the input data file to be scrubbed and/or removed. For example, the cell content identification module 452 may be configured to predict, classify, and/or identify junk rows in the input data file. A junk row may include a row that is not required for the output data file and/or a row that may be removed/deleted from the input data file. For example, a junk row may include inconsistent formatting, inconsistent content/data, and/or missing cell content/data, among others. The cell content identification module 452 and/or the model scoring module 444 may be configured to generate and/or calculate a junk row identification score for each row in the input data file.

In various implementations, the cell content identification module 452 may be configured to identify and/or predict the semantic relationships between rows of the input data file (for example, subscriber/dependent, gender, plan tier, etc.). In various implementations, the cell content identification module 452 may be configured to identify and/or predict row level relationships (e.g., relationships amongst adjacent and/or proximate rows of data). For example, the cell content identification module 452 may use the row level relationships to identify an individual as a dependent or employee, etc. The cell content identification module 452 may use a set of cues to identify and/or predict the row level relationships. A cue may include an explicit cue (e.g., relationship descriptions, age <16, etc.), content/data changes between rows (e.g., changes in last name, zip code, medplan, medtier, etc.), and/or consistency in tier and relationship groups with respect to age. In various implementations, the cues may be input parameters to a set of machine learning models as described below in Table 2:

TABLE 2

| | Feature | Relative Importance | Description |
|---|---|---|---|
| 1 | RelationshipCode | 1.000 | Enumerated relationship code values (e.g. sub Subscriber, Employee, Member, 0, 1) |
| 2 | Zip_same_before | 0.801 | Does the current row's zip match the row above it |
| 3 | Age | 0.427 | Age |
| 4 | pct_medtier_child | 0.396 | Proportion of the rows medical tier that contains minors. |
| 5 | match_child | 0.342 | Number of key columns that match the overall characteristics of children (e.g. missing MedPlan, ZipCode etc.) |
| 6 | LastName_same_before | 0.331 | Is the last name same as before |
| 7 | pct_relationship_child | 0.316 | Proportion of the rows relationship description that contains minors. |
| 8 | doh_missing | 0.231 | Is date of hire missing |
| 9 | Zip_same_after | 0.209 | Is the zip after this the same |
| 10 | MedicalCoverageTier | 0.209 | Enumerated medical coverage tier (non-standardized) |

In various implementations, the data cleansing module 456 may be configured to scrub, cleanse, and/or remove certain data of the input data file (e.g., the data identified by the cell content identification module 452 to be removed). The data cleansing module 456 may be configured to remove certain unnecessary data (for example, data that is not required in the output data file). In various implementations, the data standardization module 460 may be configured to standardize the format and/or appearance of the data in the input data file. For example, the data standardization module 460 may be configured to present all dates in the same format (e.g., mm/dd/yyyy).

In various implementations, the cell content identification module 452 may include and/or may be configured to execute a set of machine learning models that are trained (for example, via supervised training) to carry out the operation of the cell content identification module 452. The data cleansing module 456 may include and/or may be configured to execute a set of machine learning models that are trained (for example, via supervised training) to carry out the operation of the data cleansing module 456. The data standardization module 460 may include and/or may be configured to execute a set of machine learning models that are trained (for example, via supervised training) to carry out the operation of the data standardization module 460.

In various implementations, the output generation module 436 may be configured to generate output data files. The quality check and correction module 440 is configured to make certain predictions regarding the location and/or identify of data within an input data file. The quality check and correction module 440 is configured to perform certain corrective actions in response to the predictions being inaccurate.

The model scoring module 444 may be configured to generate and/or calculate various scores (for example, confidence scores) that may be used to determine the accuracy of certain features of the transformation system 400. For example, the model scoring module 444 may be configured to generate and/or calculate a header row confidence score, a column level confidence score, a junk row confidence score, a relationship model confidence score, a tier model confidence score, and/or a gender level confidence score.

Scoring may be performed locally. This may lead to extremely fast speed—for example, in various implementations, each model may score an input in less than 0.1 seconds. In various implementations, 46 models may be used per input file.

The total runtime for all models on an input file may average 120 seconds, a value that depends on number of columns, sheets, and rows. For an input file (such as a workbook file) that includes multiple sheets, each sheet may be processed in parallel to reduce runtime. In various implementations, a 65-core machine can process 2500 files per hour.

The machine learning models in the transformation system 400 may include artificial neural networks (ANNs) and gradient boosted trees and may be implemented using, as examples only, the CatBoost gradient boosting library or the XGBoost gradient boosting library. The transformation system 400 may implement regularization techniques for some or all of the gradient boosted trees to reduce overfitting effects.

In various implementations, the machine learning model training module 448 may be configured to train the machine learning models using training sets. More detailed functionality and programming of the machine learning automated data scrubbing and standardization modules 416 will be described later on with reference to detailed drawings. In various implementations, retraining may be only rarely needed.

Figure 5:
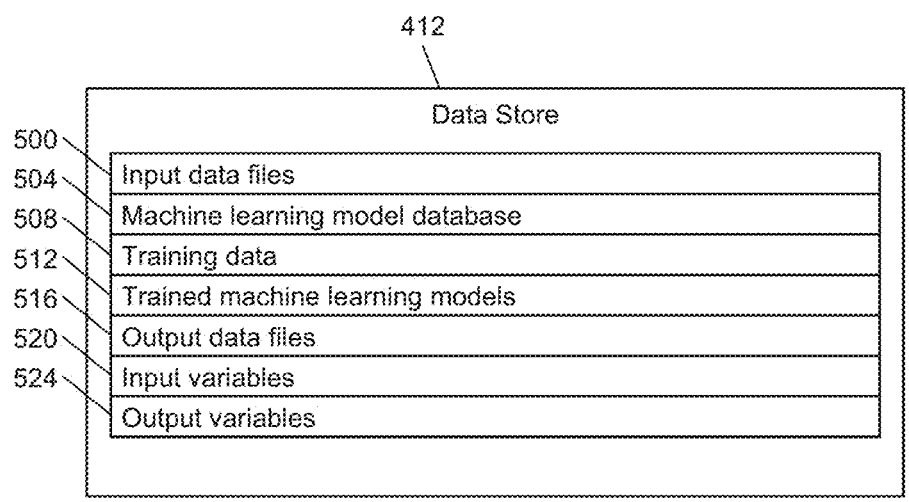
FIG. 5 is a graphical representation of example data structures that may be stored in data stores of a machine learning data transformation system.

FIG. 5 is a block diagram showing example data structures that may be stored in data stores—such as data store 412—of the transformation system 400. In various implementations, the data store 412 include input data files 500, a machine learning model database 504, training data 508, trained machine learning models 512, output data files 516, input variables 520, and/or output variables 524. In various implementations, machine learning model database 504 may include data structures related to machine learning models—such as machine learning models with default parameters. In various implementations, training data 508 may include data structures related to data sets used for training machine learning modules. In various implementations, trained machine learning models 512 may include data structures related to machine learning models that have been trained via the transformation system 400. In various implementations, the input variables 520 (i.e., features, predictors, etc.) may include data structures related to input variables for machine learning models. For example, the input variables 520 may include measurable characteristics and/or attributes that are used as inputs to the machine learning models to make predictions and/or decisions. In various implementations, output variables 524 may include data structures related to output variables from machine learning models.

Flowcharts

Figure 6:
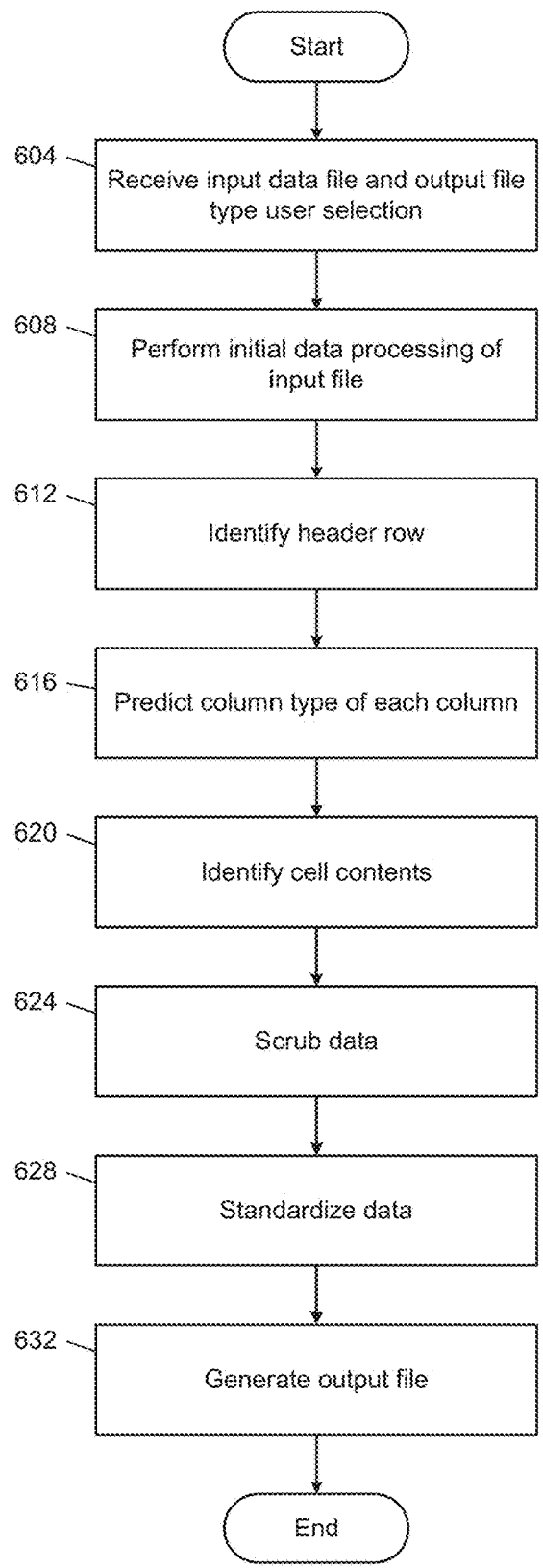
FIG. 6 is a flowchart of an example process for automatically converting an input data file into an output data file via the machine learning data transformation system.

FIG. 6 is a flowchart of an example process for automatically converting an input data file into an output data file via the transformation system 400. Control begins at 604. At 604, the data preprocessing module 420 may receive an input data file. The input data file may include a census data file having tabular semi-structured data. For example, and without limitation, the input data file may include a Microsoft Excel file format such as an XLS format, an XLSX format, or an XLSM format. The input data file may include a zip file containing a set of XML files that define the layout of the Excel workbook. Each sheet in the workbook may include its own XML file. In various implementations, the input data file may include an un-scrubbed data file Further at 604, the data preprocessing module 420 may receive an output file type user selection. For example, the user may select the output data file type they desire the transformation system 400 to generate in relation to the input data file. The transformation system 400 is configured to generate various types and/or formats of output data files, such as a census manager data file and/or a Global Pharmaceutical Resources (GRx)/Milliman data file, among others. In various implementations, a census manager data file may include various types of information about individuals including personal details, geographic information, income and economic indicators, ethnicity and race, and/or health-related data, among others. In various implementations, a GRx/Milliman data file may include detailed information related to pharmacy claims, prescriptions medications, and/or related costs, etc.

In various implementations, each of the output data files may be generated from an input data file that includes member-level census data; however, one or more of the output data files may not be generated from an input data file that only includes employee level census data. For example, the GRx/Milliman output data file may not be generated from an input data file that includes only employee level census data. Control proceeds to 608.

At 608, the data preprocessing module 420 may be configured to perform initial data processing of the received input file. In some implementations, the initial data processing may include preparing the input data for further processing via system 400. For example, the data preprocessing module 420 may be configured to remove passwords from the input data file, rename the input data file to a file id, save the original file name as metadata, and/or compress the input data file. For example, a machine learning password model may be trained on passwords—in plaintext form and/or in hashed form. The input file may then be supplied to the machine learning password model to identify any rows, columns, or cells that appear to contain passwords. For example, an element of the input file may be considered to contain passwords when an output score from the machine learning password model exceeds a threshold.

For example, in a file (such as workbook) including multiple tables (sometimes called "sheets" or "worksheets"), the data preprocessing module 420 may selectively delete a subset of the tables. In various implementations, the data preprocessing module 420 determines the subset of tables for deletion as any tables after the first threshold number within a file. As an example, the threshold may be 20, meaning that the data preprocessing module 420 deletes any tables beyond the first 20. Control proceeds to 612.

At 612, the header identification module 424 may classify, identify, locate, and/or predict the header rows of the input data file. The header identification module 424 and/or the model scoring module 444 may generate and/or calculate a header row identification score (i.e., a header row confidence score) for each row in the input data file. The score may include a value in a range of 0 to 1. The score may be calculated via at least one of the following equations:

$$\text{confidence} = (\text{pred\_row.loc[pred\_row['cnfin\_num']} > 0.35, \text{'cnfin\_num']} - 0.35)/0.65$$

$$\text{confidence} = (0.35 - \text{pred\_row.loc[pred\_row['cnfin\_num']} <= 0.35, \text{'cnfin\_num']})/0.35$$

In various implementations, a score greater than a threshold (for example, 0.9) may be considered a high confidence indication that the row is a header row. Each sheet of an input data file may include one or more header rows. In various implementations, the header identification module 424 may determine the number of columns in the input data file, whether data in subsequent rows is repeated, sequential patterns of the rows, the presence of a date, and the presence of a known first name and/or last name. Control proceeds to 616.

At 616, the column identification module 428 may predict the column type of each column of the data. The prediction may include a column type from the set of defined column type categories as described in Table 1. The column identification module 428 and/or the model scoring module 444 may generate and/or calculate a column type confidence score for each prediction. The score may include a value in a range of 0 to 1. In various implementations, a column type confidence score above a threshold (for example, 0.9) may be considered a high confidence indication that the column type prediction is accurate.

In various implementation, the column identification module 428 may include and/or may be configured to execute a set of machine learning models configured to predict the column type of each column of the data. In various implementations, the models may include a model for each column type, where each model receives as input a number of features about the column (which may include data from other columns, such as adjacency to particular columns) and outputs a likelihood that the column matches the column type.

In various implementations, the column-type-specific models include a gender model, a first name model, an age model, a date of birth (dob) model, a last name model, a names model, a zip code model, an address model, an identifier (ID) model, a state model, a city model, a relationship model (for example, relationship to an insured person), a product type (prodtype) model, a product tier (prodtier) model, a product plan (proplan) model, a medical tier (medtier) model, a medical plan (medplan) model, a dental tier (dentier) model, a dental plan (denplan) model, a vision tier (vistier) model, a vision plan (visplan) model, an insurance carrier model, a medical plan tier (medplantier) model, a dental plan tier (denplantier) model, a coverage model, a status model, a department of health (DoH) model, a dependent count (depcount) model, a waive (for example, indicating whether insurance is waived) model, a Consolidated Omnibus Budget Reconciliation Act (COBRA) model, an occupation model, a salary model, and a key model. In various implementations, the models may be run and/or executed in a specific order to maximize statistical model performance. For example, the models may be stacked.

In various implementations, the column identification module 428 may include and/or may be configured to execute a set of machine learning models that rely on certain properties of the columns in the input data file to predict the column type of each column. For example, the properties may include the column header (for example, a description of the data), content values (for example, the value of the contents in a column), column adjacency (for example, what columns are near a given column), and/or spreadsheet-level features (for example, the left-to-right position of a column in the input data file).

In various implementations, a set of features (i.e., input variables) may be used via the column identification module 428 to identify the properties of the columns in the input data file. The features may include a set of header features, a set of content features, a set of spreadsheet-level features, and/or a set of other features.

In various implementations, the header features may include an extension of header features of the header identification model. For example, the header features include the location and/or identity of the header and the rows above and below the header. The header features may include prior column headers, the most popular (n-grams) words, bigrams, and/or trigrams within the headers of a particular class.

In various implementations, the content features may describe the content (i.e., the data) within each column below the header. The content features may include content properties and/or learned data through bag-of-words. The known content properties may include date distributions of date of birth, date of hire, first name, last name, and/or all U.S. 5-digit zip codes. The learned features may include the top n-grams for each column type.

In various implementations, the convolution features may include features that account for the relationship between neighboring columns. For example, first name and last name are usually adjacent and/or plans/tiers for a particular plan type are typically next to each other. The convolution features for a specific column may include all header and/or content level attributes for three columns before and after the specific column.

In various implementations, the spreadsheet-level features may include features that describe the overall properties of a spreadsheet (i.e., the input data file). For example, the spreadsheet-level features may include column index, minimum and maximum values in a spreadsheet, and/or the differences between the minimum and maximum values. In various implementations, the other features may include features that are created to improve efficiency in a statistical sense. For example, the other features may include explicit features that denote unambiguous properties of particular classes such as any column that contains HMO or PPO should be considered a medical plan. Control proceeds to 620.

At 620, the cell content identification module 452 may classify, identify, and/or predict data of the input data file to be scrubbed and/or removed. For example, the cell content identification module 452 may predict, classify, and/or identify junk rows in the input data file. The cell content identification module 452 and/or the model scoring module 444 may generate and/or calculate a junk row identification score for each row in the input data file. The score may include a value in a range of 0 to 1. In various implementations, a junk row identification score above a threshold (for example, 0.9) is considered a high confidence indication that the row includes a junk row. Control proceeds to 624.

At 624, the data cleansing module 456 may scrub, cleanse, and/or remove certain data of the input data file (e.g., the data identified by the cell content identification module 452 to be removed). Control proceeds to 628. At 628, the data standardization module 460 may standardize the format and/or the appearance of the data in the input data file. Control proceeds to 632. At 632, the output generation module 436 may generate an output data file.

The transformation system 400 may execute the machine learning models in a user selected order such to convert the input data file into the output file. For example, the machine learning models may be executed in a cascading and/or a sequential order such that the output data of an executed model and/or features of the input data are supplied to a subsequent model.

Figure 15:
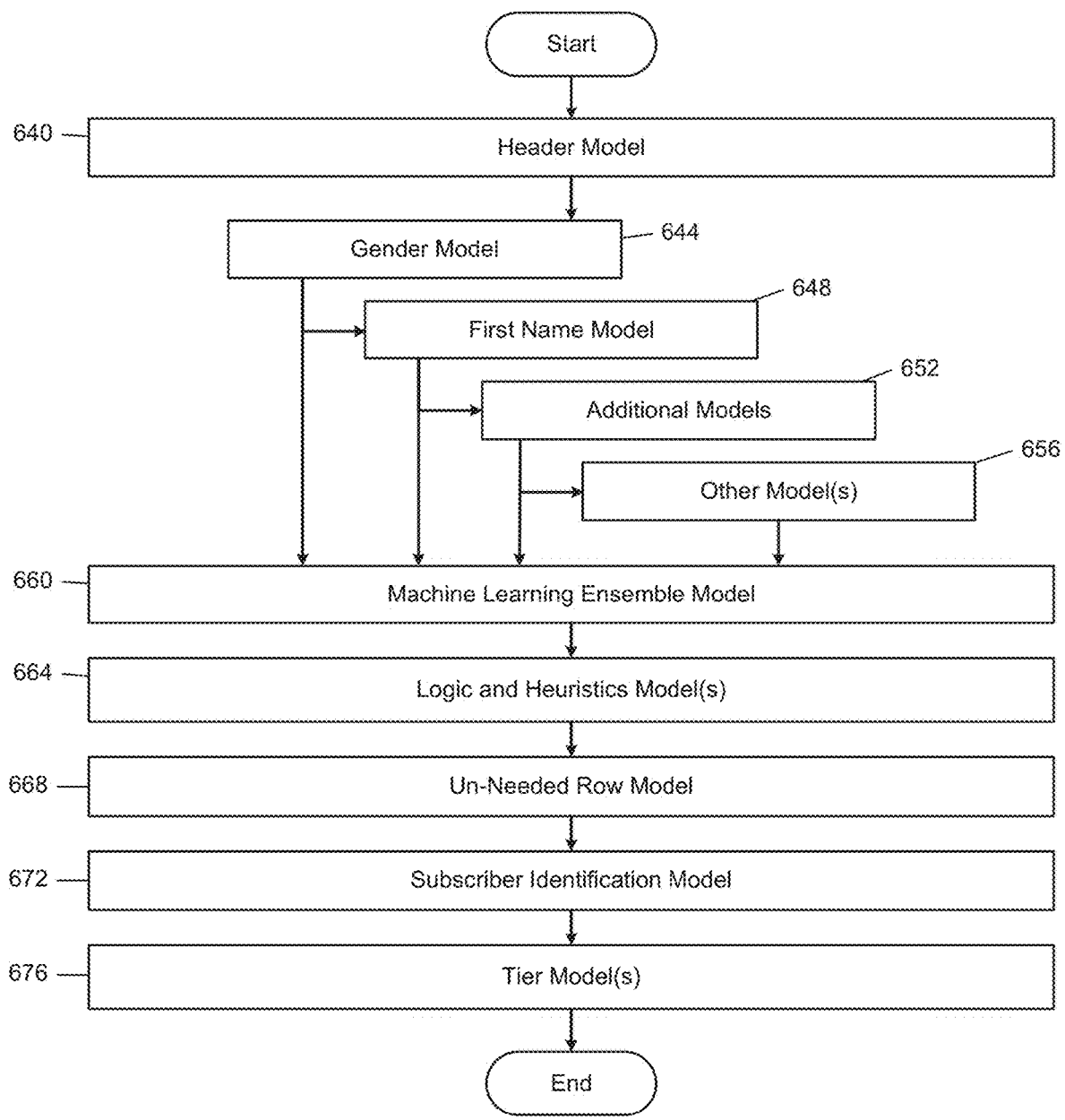
FIG. 15 is a flowchart of an example order for executing machine learning models.

With reference to FIG. 15, an example order for executing certain machine learning models is shown. Control begins at 640. At 640, the header model may be supplied with the input data, may generate header row identification data, and may supply the header row identification data and/or features of the input data to one or more of the column models. Control proceeds to 644. At 644, the user may define the order that the column models are executed. In the illustrative example, the gender model may generate gender data and may supply the gender data and/or features of the input data to the first name model and/or the machine learning ensemble model. Control proceeds to 648.

At 648, the first name model may generate first name data and may supply the first name data and/or features of the input data to a subsequent column model and/or the machine learning ensemble model. Control proceeds to 652. At 652, the remaining column models are executed in the user selected order such that the output data of an executed column model and/or features of the input data may be supplied to a subsequent column model and/or the machine learning ensemble model. Control proceeds to 656.

At 656, other machine learning model(s) may be supplied output data and/or features of the input data from the last executed column model, the other machine learning model(s) may generate output data, and may supply the output data and/or features of the input data to the machine learning ensemble model. Control proceeds to 660. At 660, the machine learning ensemble model may generate ensemble output data and may supply the ensemble output data and/or features of the input data to the logic and heuristics model(s). Control proceeds to 664.

At 664, the logic and heuristics model(s) may generate logic and heuristics data and may supply the logic and heuristics data and/or features of the input data to the un-needed row model. Control proceeds to 668. At 668, the un-needed row model may generate un-needed row data and may supply the un-needed row data and/or features of the input data to the subscriber and/or dependents identification model. Control proceeds to 672.

At 672, the subscriber and/or dependents identification model may generate subscriber and/or dependents data and may supply the subscriber and/or dependents data and/or features of the input data to tier model(s). Control proceeds to 676. At 676, the tier model(s) may be executed.

EXAMPLES

Figure 7:
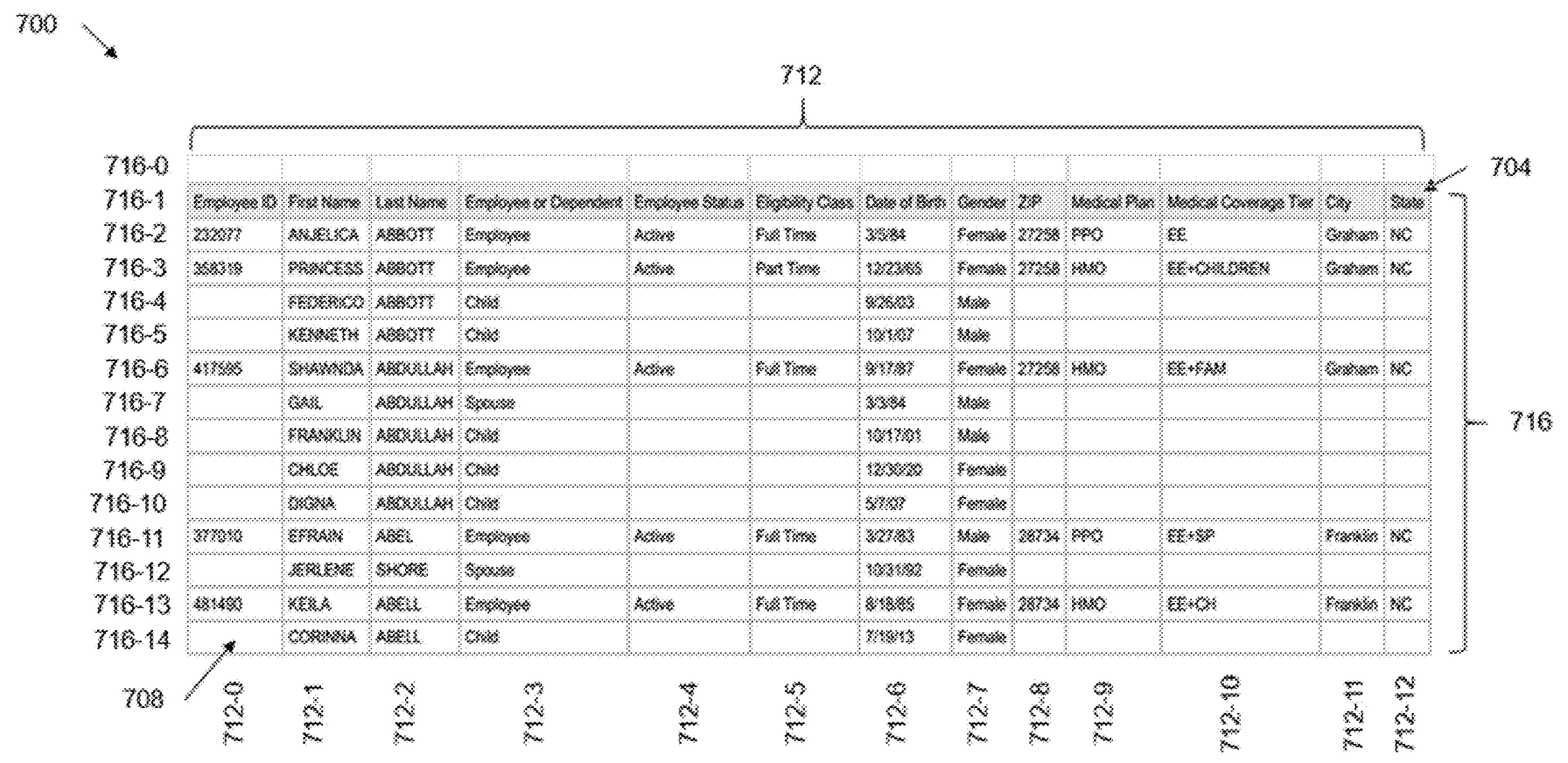

FIG. 7 presents a simple example of an input data file 700. The example input data file 700 is shown including a header 704 and data 708. The data 708 pertains to a set of individuals and is arranged in a set of columns 712 and a set of rows 716. The data 708 includes an individual's employee ID, first name, last name, employee or dependent classification, employee status, eligibility class, date of birth, gender, zip code, medical plan identification, medical coverage tier, city, and state, if available and/or applicable. The input data file 700 is shown including 13 columns (e.g., columns 712-0-712-12) and 15 rows (e.g., rows 716-0-716-14). This number of rows and columns has no special significance a file may have more or fewer columns and rows.

FIG. 8 presents an example of an output 720 generated via the header identification module 424 identifying the header row (for example, the header 704) of the input data file 700. The output 720 includes a header row identification score 724 (i.e., probability of being a header row) for each row 716 of the input data file 700. In some instances, a score 724 of greater than a threshold (for example, 0.9) indicates that the row contains a header row. In the present example, the output 720 identified the row 716-1 as the header row since the row 716-1 includes a score 724 (for example, 0.962) greater than the threshold. In various implementations, at most one header row is identified and the row with the highest header row identification score is considered for designation as the header row. However, in various implementations, with the highest header row identification score is designated as the header row only if the score is greater than a threshold (for example, 0.2).

In various implementations, the header identification module 424 may use input variables (e.g., input variables 520) in connection with a set of machine learning model to predict the location of the header row. For example, the input variables may include any combination of the data structures described in Table 3 below:

TABLE 3

| Feature Name | Avg. Importance | Description |
| --- | --- | --- |
| row | 7.062800 | Row Number |
| repeated_below | 4.815823 | does the current cell occur below this cell within the same column (max over all columns within the row) |

TABLE 3-continued

| Feature Name | Avg. Importance | Description |
|---|---|---|
| max_ratio_gender_below | 6.335238 | max gender (M/F or male/female) below a given row (max over all columns) |
| max_float_ratio | 5.476044 | proportion float after a given row (max over all columns) |
| repeated_below_max | 2.066048 | repeated below (max over sheet, differenced) |
| max_exact_match_ratio_max | 5.185750 | max exact match ratio (max in sheet) |
| max_exact_match_ratio | 10.262571 | number of cells in bag of words (match >0.5) over non-blank cells. |
| format_change_below | 9.470572 | does the format change below (xlsx and xls files only, max over all columns) |
| ratio_blank_cells_max | 4.368588 | ratio blank cells (max over sheet, differenced) |
| max_date_ratio | 4.626408 | proportion of date after a given row |
| blank_cells_max | 0.860798 | blank cells (max in sheet, differenced) |
| max_rows | 2.500496 | number of rows in file |
| format_change_below_max | 2.665271 | (max over sheet, differenced) |
| ratio_merged_cells | 1.408627 | ratio of merged cells/all cells in row |
| max_float_ratio_max | 2.406337 | (max over sheet, differenced) |
| ratio_blank_cells | 6.072555 | ratio of blank cells/all cells in row |
| monotonic_below_max | 1.568401 | (max over sheet, differenced) |
| max_cols | 1.564775 | ratio of blank cells/all cells in row |
| max_ratio_zip_code_below_max | 0.929244 | (max over sheet, differenced) |
| blank_cells | 1.882682 | number of blank cells |
| monotonic_below | 2.561680 | monotonic below a given column (max over all columns) e.g. a[i] > a[i + 1] |
| header_medtier | 1.372594 | medtier BoW match (max over all columns) |
| max_ratio_zip_code_below | 1.030388 | ratio zip code below (max over all columns |
| header_other | 0.519529 | other BoW match (max over all columns) |
| header_lastname | 0.189490 | lastname BoW match (max over all columns) |
| ratio_merged_cells_max | 0.896255 | (max over sheet, differenced) |
| max_ratio_gender_below_max | 1.691153 | (max over sheet, differenced) |
| header_status | 0.365968 | status BoW match (max over all columns) |
| header_doh | 0.639966 | DoH BoW match (max over all columns) |
| header_gender | 0.298612 | gender BoW match (max over all columns) |
| merged_cells_max | 0.316468 | (max over sheet, differenced) |
| merged_cells | 0.536152 | count of merged cells |
| header_zipcode | 1.025196 | zipcode BoW match (max over all columns) |
| header_firstname | 0.508696 | firstname BoW match (max over all columns) |
| header_match_sum | 1.182970 | sum of header name match (>0.5) |
| max_date_ratio_max | 1.070057 | (max over sheet, differenced) |
| max_cols_nonblank | 1.352775 | max cols that are non-match within sheet |
| header_relationship | 0.769135 | relationship BoW match (max over all columns) |
| max_exact_match | 0.026655 | best exact match over all columns |
| header_match_sum_max | 0.020069 | header match sum (max over sheet, differenced) |

Referring now to FIG. 9, the column identification module 428 may replace the previously identified header row of the input data file 700 with a column name 728 (for example, x_0-x_12) for each of the set of columns 712. FIG. 10 presents an example of an output 732 generated via the column identification module 428. The output 732 may include a column type prediction 736 for each column and a column type confidence score 740 for each column type prediction 736. In various implementations, a column type confidence score 740 above a threshold (for example, 0.9) is considered a high confidence indication that the column type prediction 736 is accurate.

In various implementations, the column identification module 428 may use input variables (e.g., input variables 520) in connection with a set of machine learning models to predict and/or identify the column types. For example, the input variables may include any combination of the data structures described in Table 4 below, which includes just three of the key variables (gender, first name, and age) for conciseness:

TABLE 4

| | Feature Name | Key_var |
|---|---|---|
| 1 | words_freq | gender |
| 2 | content_similarity_all_gender | gender |

TABLE 4-continued

| | Feature Name | Key_var |
|---|---|---|
| 3 | ml_gender | gender |
| 4 | ml_word2vec_gender | gender |
| 5 | tier_all_adj | gender |
| 6 | fold | gender |
| 7 | response | gender |
| 8 | first_name | firstname |
| 9 | first_name_localized | firstname |
| 10 | first_name_localized_soft | firstname |
| 11 | first_name_soft | firstname |
| 12 | gender_count | firstname |
| 13 | gender_enumerated | firstname |
| 14 | is_na | firstname |
| 15 | last_name | firstname |
| 16 | ml_firstname | firstname |
| 17 | ml_firstname_diff | firstname |
| 18 | ml_word2vec_firstname | firstname |
| 19 | ml_word2vec_firstname_diff | firstname |
| 20 | pmi_firstname | firstname |
| 21 | unique | firstname |
| 22 | words_first | firstname |
| 23 | response | firstname |
| 24 | fold | firstname |
| 25 | can_numeric | age |
| 26 | header_full_age | age |
| 27 | ml_word2vec_age | age |

TABLE 4-continued

| | Feature Name | Key_var |
|---|---|---|
| 28 | ml_word2vec_age_diff | age |
| 29 | ml_age | age |
| 30 | ml_age_diff | age |
| 31 | pmi_age | age |
| 32 | valid_age | age |
| 33 | valid_any_age | age |
| 34 | monotonic | age |
| 35 | response | age |
| 36 | fold | age |

Figure 11:
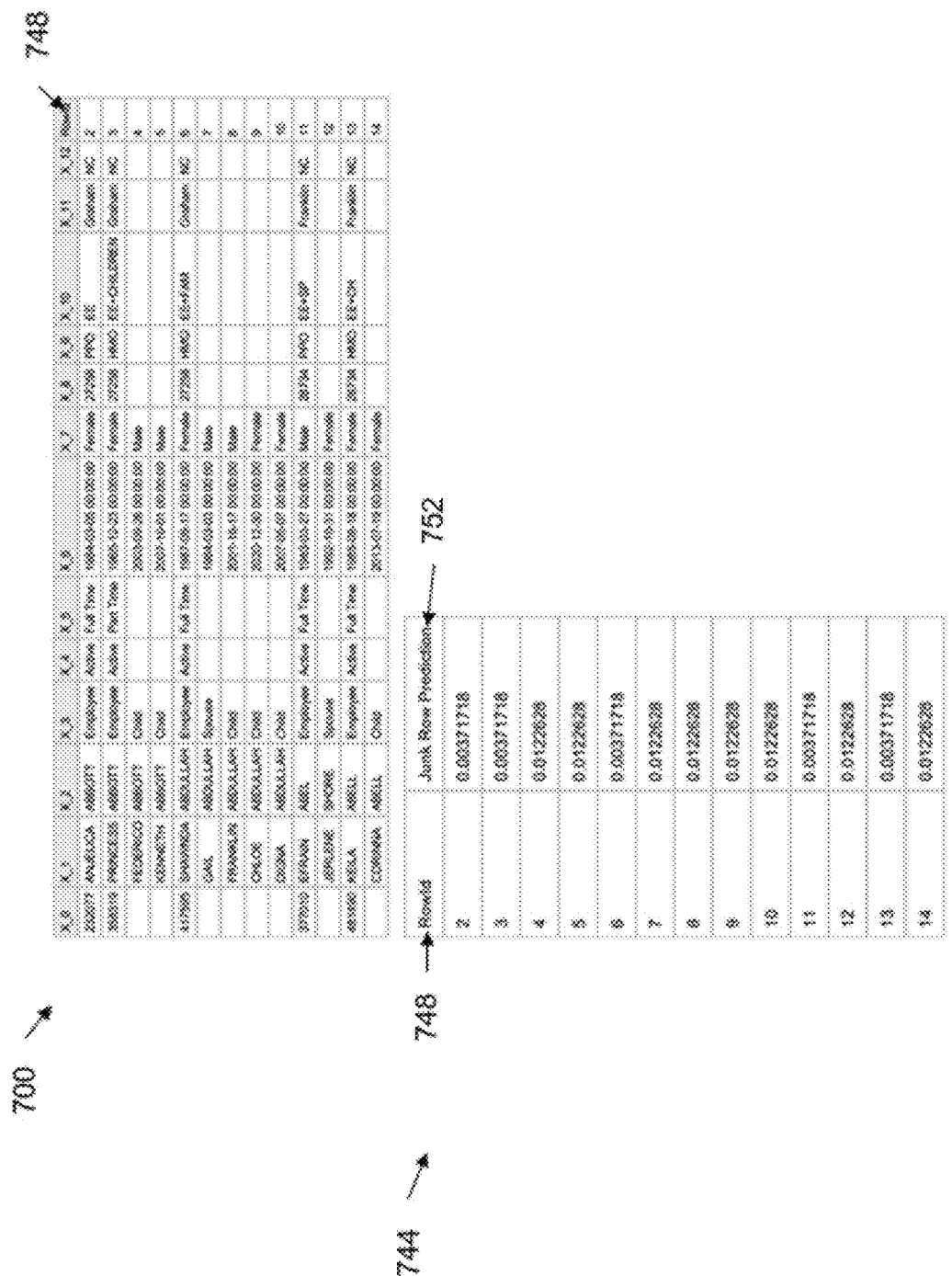
FIG. 11 is an illustration of the example input data file of FIG. 7 undergoing one or more processing steps and a cell content identification output.

FIG. 11 presents an example of an output 744 generated via the cell content identification module 452 identifying which rows of the input data file 700 are junk rows that may be removed from the input data file 700. In various implementations, the output 744 may include a Rowid 748 for each row 716 of the input data file 700 and a junk row identification score 752 (i.e., probability of being a junk row). In various implementations, a junk row identification score 752 above a threshold (for example, 0.9) is considered a high confidence indication that the row is a junk row. In various implementations, the cell content identification module 452 may add the Rowid 748 (for example, as an additional column) to the input data file 700.

In various implementations, the cell content identification module 452 may use input variables (e.g., input variables 520) in connection with a set of machine learning models to predict and/or identify the junk rows. For example, the input variables may include any combination of the data structures described in Table 5 below:

TABLE 5

| Feature Name | Avg. Importance | Description |
|---|---|---|
| repeat_value | 1.00 | Is the row duplicated |
| p_colon | 0.67 | Proportion of cells with ':' in the row |
| row_number_down | 0.64 | Row Number (increasing order) |
| p_blankish | 0.55 | Proportion of cells blank in row (including zero-content such as ' -- select -- ') |
| max_name_length | 0.51 | Number of chars in name (first/last/names) |
| r_blankish | 0.36 | Relative proportion blank (within sheet) (including zero-content such as ' -- select -- ') |
| present_age | 0.32 | Is an age column non-blank in the sheet and between 0 and 100 |
| r_colon | 0.31 | Relative proportion of columns with a colon |
| n_colon | 0.30 | Number of cells with a colon |
| present_gender | 0.26 | Is a gender column non-blank and m/f/male/female in the sheet |
| n_blankish | 0.25 | Count of blank cells (including zero-content such as ' -- select -- ') |
| r_blank | 0.25 | Relative proportion number of blank sells in row |
| present_zip | 0.22 | Is a zip column non-blank and extractable in the sheet |
| popular_name_or_age_and_gender | 0.2 | If you have columns for firstname, age, and gender, then you should either have (non-missing age & gender) or (a popular firstname) |
| present_names | 0.19 | Are first/last/names present in the sheet (nonblank) |
| p_blank | 0.19 | Proportion of blank cells in row |
| n_blank | 0.17 | Number of blank cells |
| r_headerish | 0.16 | Relative proportion of cells that contain header synonyms |
| row_number_up | 0.15 | Row Number (decreasing order) |
| present_products | 0.15 | Are there prodtier/prodtype/prodplan columns within the sheet |
| repeat_value_r | 0.15 | ratio of unique cell values within a row over all cells within a row |
| popular_first_name | 0.14 | Is the firstname in the top 5,000 baby names per ssn database |
| p_headerish | 0.07 | proportion of columns that match well-known header names |
| present_age_col | 0.05 | is there an age column (dob or age) present in the sheet |
| present_lastnames_col | 0.05 | is there a lastnames column present in the sheet |
| n_headerish | 0.02 | number of headerish columns within a row |
| known_sample | 0.01 | is the row a known sample |
| present_zip_col | 0.01 | is there a zipcode column within the sheet |
| number_in_names | 0.01 | is there a number in the names columns |
| present_gender_col | 0.00 | is there a gender column within the sheet |
| dup_row | 0.00 | is this a duplicate row |
| example_sample | 0.00 | are the words (example) or (sample) within the row |
| number_in_gender | 0.00 | is the gender column numeric |
| n_tableish | 0.00 | the number of columns |
| plan_in_names | 0.00 | are there plan names within the name column (per row) |
| present_firstnames_col | 0.00 | is there a firstnames column within the sheet |

Figure 12:
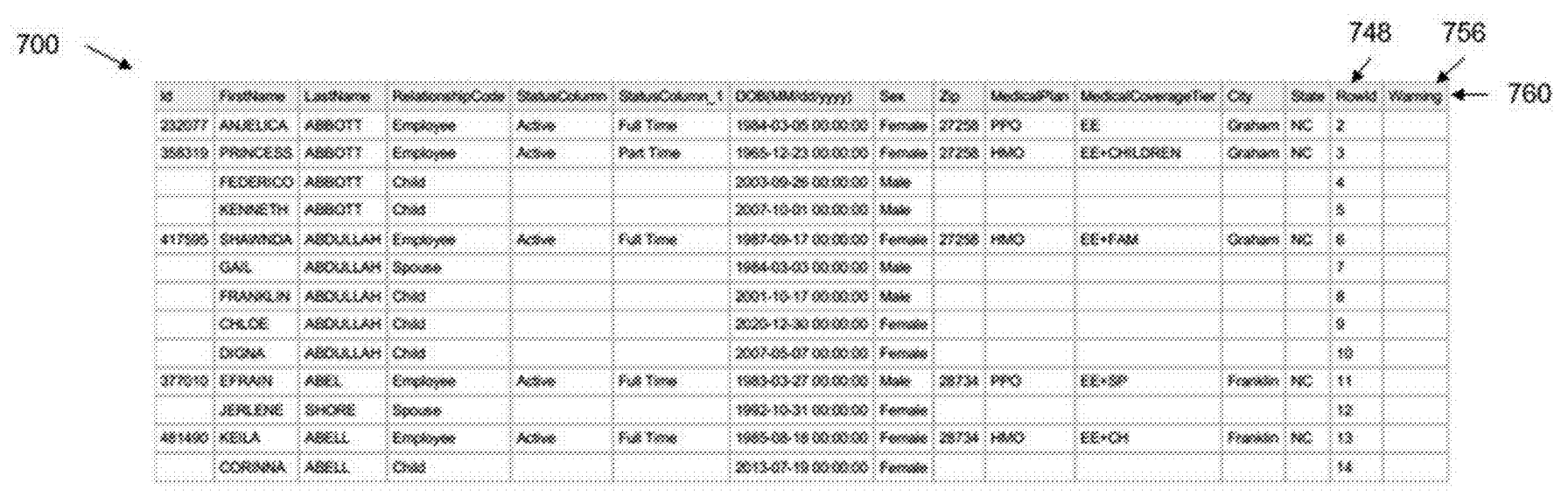

Referring now to FIG. 12, the transformation and standardization modules 432 may add a warning column 756 to the input data file 700 and may replace the column names 728 with column labels 760 that correspond to the previously predicted column types.

In various implementations, data of the warning column 756 may include any combination of the data structures described below in Table 6:

TABLE 6

| Warning | Description |
| --- | --- |
| No Dob or Age | No DoB or age is provided on the sheet. |
| Multiple Non-Identical Medical Tier | Multiple non-matching tiers of the same type (Med/Den/Vis) were identified (e.g. Tier-2 Tier-4 Tier-5) |
| Filled in Last Name. | Last name filled in from employee to dependent |
| Duplicate Person | Person repeated multiple times (common for multi-plan products or for spouse/child also employee) |
| Duplicate Person Employee and Dependent | Person repeated twice is a dependent and an employee |
| Potential Issue with Carriers | Multiple carriers and multiple products (med/den/vis) that are not clearly aligned with med/den/vis. |
| Potential Issue with Waive | Multiple waive columns and multiple products (med/den/vis) that are not clearly aligned with med/den/vis. |
| Minor Employee | Employee under the age of 15 as of today |
| Age Missing | Age is missing and cannot be calculated from DoB |
| Zip Missing | Zipcode is missing or is invalid. |
| DOB Missing | DOB is missing or is invalid. |
| Sex Missing | Gender is missing or is invalid. |

Figure 13:
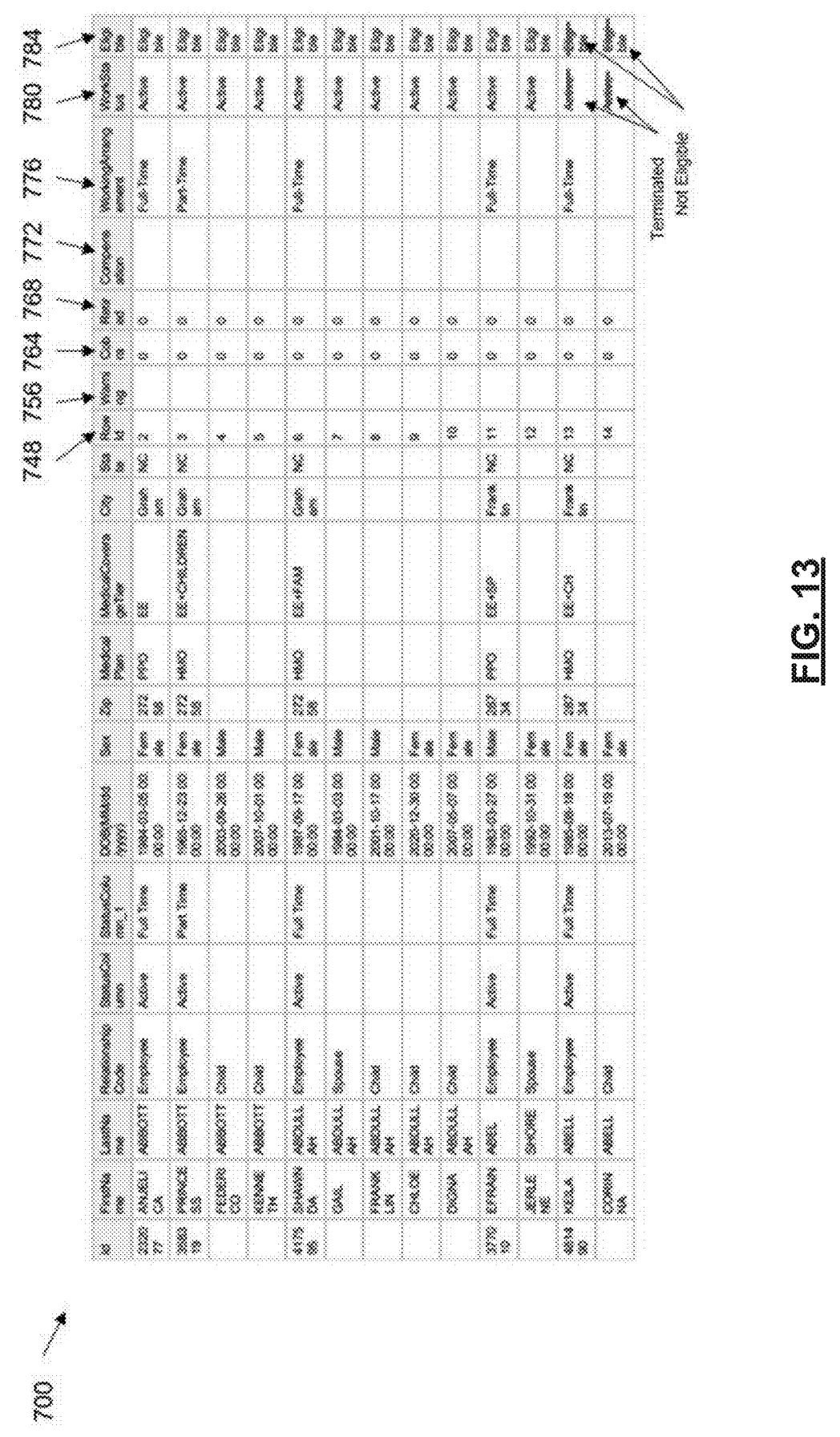

With reference to FIG. 13, the transformation and standardization modules 432 may add additional status columns to the input data file 700. The status columns may include a cobra column 764, a retired column 768, a compensation column 772, a working arrangement column 776, a working status column 780, and/or an eligibility column 784. Data in the cobra column 764 may include a '1' for indicating that the individual includes cobra health benefits and a 'O' for indication that the individual does not cobra health benefits. Data in the retired column 768 may include '1' for indicating that the individual is retired and a '0' for indicating that the individual is not retired. Data in the compensation column 772 may include the compensation of the individual if available and/or applicable. Data in the working arrangement column 776 may include whether the individual works full time or part time. Data in the working status column 780 may include 'active' for indicating that the individual is an active employee or a dependent of an active employee and 'terminated' for indicating that the individual is a nonactive employee or is a dependent of nonactive employee. Data in the eligibility column 784 may include whether the individual is eligible for certain health benefits (e.g., medical, dental, vision, etc.). Data in the eligibility column 784 may be correlated with the data of the working status column 780. For example, an 'active' individual may be 'eligible' for certain health benefits and/or a 'terminated' individual may be 'not eligible' for certain health benefits.

Figure 14:
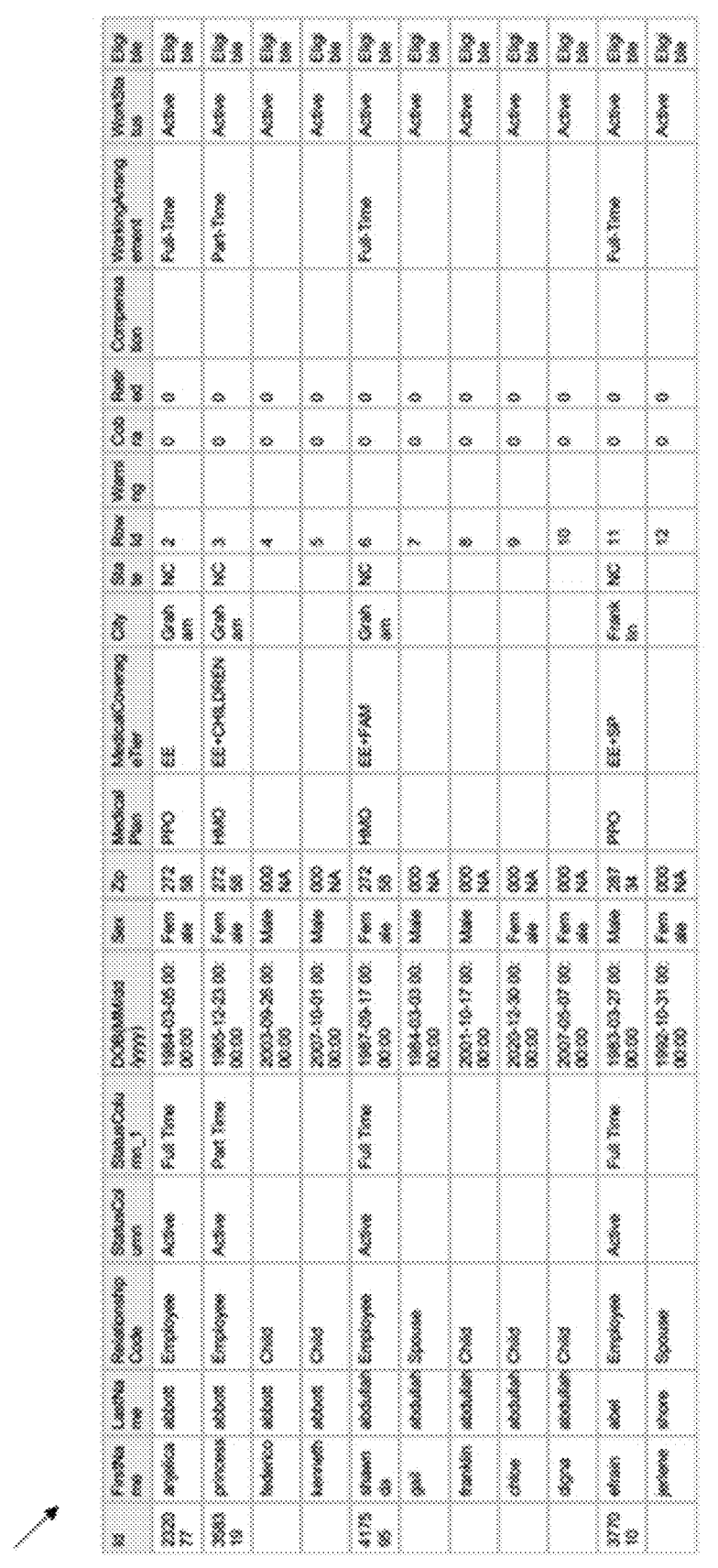

FIG. 14 presents an example of an output data file 800 generated via the output generation module 436. The output data file 800 may be in the census manager file type format. The output data file 800 includes data in a standardized format. For example, the date of birth data is included in the same format (for example, mm/dd/yyyy or yyyy-mm-dd) for all the individuals. Unnecessary data has been removed from the output data file 800. For example, individuals who are not eligible for health benefits (e.g., Keila Abell, Corinna Abell) have been removed from the output data file 800.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements as well as an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module."

The term "module" may refer to, be part of, or include processor hardware (shared, dedicated, or group) that executes code and memory hardware (shared, dedicated, or group) that stores code executed by the processor hardware.

The module may include one or more interface circuit(s). In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer-implemented method comprising:
receiving input data that is organized into a set of rows and a set of columns;
maintaining a machine learning header model that is trained on tabular data with header rows;
supplying the input data as input to the machine learning header model to generate header row identification data that identifies a set of header rows that is a subset of the set of rows;
maintaining a machine learning column model that is trained on tabular data;
supplying the header row identification data and features of the input data to the machine learning column model to generate column label data that applies a set of defined labels to the set of columns, wherein:
the machine learning column model includes a plurality of column-specific machine learning models,
each of the plurality of column-specific machine learning models corresponds to a respective one of the set of defined labels, and
the set of defined labels includes an undefined label;
for each column of the set of columns:
determining scores from the plurality of column-specific machine learning models for the column;
determining a highest scoring model of the plurality of column-specific machine learning models;
selectively applying the one of the set of defined labels corresponding to the highest scoring model to the column; and
applying the undefined label to the column in response to the score of the highest scoring model being less than a threshold; and
generating output data that is organized into rows and columns, wherein columns of the output data are labelled based on the column label data.

2. The method of claim 1 wherein, to each of the set of columns, the column label data applies one of the set of defined labels.

3. The method of claim 1 wherein:
supplying the header row identification data and features of the input data to the machine learning column model includes, for each column of the set of columns, supplying features of the column to each of the plurality of column-specific machine learning models; and
for each column of the set of columns, the features include data values from the column.

4. The method of claim 3 wherein, for each column of the set of columns, the features include a relative position of the column to other columns in the input data.

5. The method of claim 3 wherein, for each column of the set of columns, the features include an absolute left-to-right position of the column in the input data.

6. The method of claim 1 further comprising:
using the machine learning header model to determine a header row score for a subset of the set of rows; and
in response to the header row score for a row exceeding a threshold, including the row in the header row identification data.

7. The method of claim 6 further comprising replacing the set of header rows with the column label data.

8. The method of claim 1 further comprising:
maintaining a machine learning junk model that is trained on tabular data;
supplying features of the input data to the machine learning junk model to generate junk scores for the set of rows; and
for any row of the set of rows having a junk score above a threshold, excluding the row from the output data.

9. The method of claim 1 further comprising preprocessing the input data by:
maintaining a machine learning password model that is trained on passwords;
supplying the input data to the machine learning password model to generate password likelihood scores; and
excluding elements of the input data from further processing in response to the element having a password likelihood score exceeding a threshold.

10. The method of claim 1 wherein:
the input data is received as a set of files; and
the output data includes a file.

11. The method of claim 1 wherein the input data includes at least one of semi-structured data and tabular data.

12. The method of claim 11 further comprising parsing the semi-structured data into the input data by organizing the semi-structured data into the set of rows and the set of columns.

13. A system comprising:
processor hardware; and
memory hardware configured to store instructions that, when executed by the processor hardware, cause the processor hardware to perform operations, wherein the operations include:
receiving input data that is organized into a set of rows and a set of columns;
maintaining a machine learning header model that is trained on tabular data with header rows;
supplying the input data as input to the machine learning header model to generate header row identification data that identifies a set of header rows that is a subset of the set of rows;
maintaining a machine learning column model that is trained on tabular data;
supplying the header row identification data and features of the input data to the machine learning column model to generate column label data that applies a set of defined labels to the set of columns, wherein:
the machine learning column model includes a plurality of column-specific machine learning models,
each of the plurality of column-specific machine learning models corresponds to a respective one of the set of defined labels, and
the set of defined labels includes an undefined label;
for each column of the set of columns:
determining scores from the plurality of column-specific machine learning models for the column;
determining a highest scoring model of the plurality of column-specific machine learning models;
selectively applying the one of the set of defined labels corresponding to the highest scoring model to the column; and
applying the undefined label to the column in response to the score of the highest scoring model being less than a threshold; and
generating output data that is organized into rows and columns, wherein columns of the output data are labelled based on the column label data.

14. The system of claim 13 wherein, to each of the set of columns, the column label data applies one of the set of defined labels.

15. A non-transitory computer-readable medium storing processor-executable instructions, the instructions comprising:
- receiving input data that is organized into a set of rows and a set of columns;
- maintaining a machine learning header model that is trained on tabular data with header rows;
- supplying the input data as input to the machine learning header model to generate header row identification data that identifies a set of header rows that is a subset of the set of rows;
- maintaining a machine learning column model that is trained on tabular data;
- supplying the header row identification data and features of the input data to the machine learning column model to generate column label data that applies a set of defined labels to the set of columns, wherein:
  - the machine learning column model includes a plurality of column-specific machine learning models,
  - each of the plurality of column-specific machine learning models corresponds to a respective one of the set of defined labels, and
  - the set of defined labels includes an undefined label;
- for each column of the set of columns:
  - determining scores from the plurality of column-specific machine learning models for the column;
  - determining a highest scoring model of the plurality of column-specific machine learning models;
  - selectively applying the one of the set of defined labels corresponding to the highest scoring model to the column; and
  - applying the undefined label to the column in response to the score of the highest scoring model being less than a threshold; and
- generating output data that is organized into rows and columns, wherein columns of the output data are labelled based on the column label data.

* * * * *